US010701409B1

(12) United States Patent
Gupta (10) Patent No.: US 10,701,409 B1
(45) Date of Patent: Jun. 30, 2020

(54) SYSTEM AND METHOD FOR SELECTIVELY REPLACING COMMERCIALS THAT ARE IN A VIDEO DATA STREAM WITH ALTERNATIVE COMMERCIALS

(71) Applicant: Alphonso Inc., Mountain View, CA (US)

(72) Inventor: Manish Gupta, Bangalore (IN)

(73) Assignee: Alphonso Inc., Mountain View, CA (US)

( * ) Notice: Subject to any disclaimer, the term of this patent is extended or adjusted under 35 U.S.C. 154(b) by 0 days.

(21) Appl. No.: 16/153,958

(22) Filed: Oct. 8, 2018

(51) Int. Cl.
*H04N 21/234* (2011.01)
*H04N 21/442* (2011.01)
*H04N 21/433* (2011.01)
*H04N 21/454* (2011.01)

(52) U.S. Cl.
CPC ... *H04N 21/23424* (2013.01); *H04N 21/4331* (2013.01); *H04N 21/44204* (2013.01); *H04N 21/44213* (2013.01); *H04N 21/454* (2013.01)

(58) Field of Classification Search
CPC ............. H04N 21/4532; H04N 21/812; H04N 21/44204; H04N 21/44016; H04N 21/44222; H04N 21/25883; H04N 21/25891; H04N 21/4755
See application file for complete search history.

(56) References Cited

U.S. PATENT DOCUMENTS

| 8,966,520 B2 | 2/2015 | Tom et al. |
| 9,066,159 B2 | 6/2015 | Mak |
| 9,628,836 B1 * | 4/2017 | Kalampoukas .... H04N 21/2407 |
| 2011/0289114 A1 | 11/2011 | Yu et al. |

(Continued)

OTHER PUBLICATIONS

Audible Magic® product brochures: Core Technology & Services Overview, Broadcast Monitoring, and Media Identification, Audible Magic Corporation, Los Gatos, California, downloaded from web pages at http://www.audiblemagic.com, download date: Aug. 11, 2016, 11 pages.

(Continued)

*Primary Examiner* — Hsiungfei Peng
*Assistant Examiner* — Fred Peng
(74) *Attorney, Agent, or Firm* — Panitch Schwarze Belisario & Nadel LLP (57) ABSTRACT

Systems and methods are provided for selectively replacing commercials that are in a video data stream with alternative commercials. Automatic content recognition (ACR) is performed on the video data stream to detect the identity of each of the commercials played in a commercial block during a commercial break. Commercials in the video data stream which are detected as being displayed on a video display device are stored in a first database, and commercials in the video data stream which are detected as not being displayed on the video display device are stored in a second database. A rules engine defines how commercials in the video data stream should be replaced with other commercials. Commercials in the video data stream that were previously detected as being displayed on the video display device are selectively replaced with commercials that were previously detected as not being displayed on the video display device.

16 Claims, 4 Drawing Sheets

(56) References Cited

U.S. PATENT DOCUMENTS

| | | | |
|---|---|---|---|
| 2012/0020647 A1* | 1/2012 | Vogel | H04N 5/765 386/251 |
| 2013/0071090 A1 | 3/2013 | Berkowitz et al. | |
| 2013/0205318 A1 | 8/2013 | Sinha et al. | |

OTHER PUBLICATIONS

Gracenote Entourage™, Gracenote, Inc., Emeryville, California, downloaded from webpage: http://www.gracenote.com/video/media-recognition-and-insights/, download date: Aug. 24, 2016, 5 pages.
Stefan Pham et al., "Implementing Dynamic Ad Insertion in HTML5 Using MPEP Dash", International Broadcasting Convention (IBC), IBC 2016 Conference: Amsterdam, Netherlands, Sep. 8-12, 2016.

\* cited by examiner

Figure 1

Fair-Ad-Player Logic

[STEP-1]: Detect if an Ad ('ad1') is being aired on the tv feed

[STEP-2]: IF the 'ad1' is present in (26)
THEN
  [STEP-2a]: replace 'ad1' with some other ad 'ad2' from (24)
ELSE
  [STEP-2c]: let the 'ad1' stream to the TV screen
END_IF

[STEP-3]: (Get the feedback from the device/screen)

[STEP-4]: IF the Ad 'ad1' got aired (made it to the screen) successfully
THEN
  [STEP-4a]: Add the 'ad1' into (26) # if not there already
  [STEP-4b]: update airing statistics for 'ad1' (such as screen time etc) in (26).
ELSE_IF the Ad 'ad1' did not get aired (did not make it to the screen) successfully
  [STEP-4c]: IF 'ad1' is not present in (26)
  THEN
    [STEP-4c-1]: Add the 'ad1' into(24).Ad has been skipped. Store it for future replacement.
  ELSE
    [STEP-4c-2]: DO NOTHING. The Ad 'ad1' was played earlier. So can not be marked as skipped.
  END_IF
ELSE_IF the Ad 'ad2' got aired (made it to the screen) successfully
  [STEP-4d]: Add the 'ad2' into (26)
  [STEP-4e]: update airing statistics for 'ad2' (such as screen time etc) in(26)
  [STEP-4f]: remove 'ad2' from (24)
END_IF

Figure 2 first database 24 viewed commercials

| ID of commercial | Brand | Product type | Title of commercial | Length of commercial | Content rating of commercial | Total number of views in past "x" number of days | Viewing details (date/time of each view, channel or media stream of each view) |
|---|---|---|---|---|---|---|---|
| 4931 | Toyota | vehicle | Toyota Camry | 0:29 | G | 3 | NBC |
| 4939 | Apple | smartphone | Iphone Xs | 0:29 | G | 1 | ABC |
| . . | . . | . . | . . | . . | . . | . . | . . |
| . . | . . | . . | . . | . . | . . | . . | . . |

Figure 3 second database 26 not viewed commercials

| ID of commercial | Brand | Product type | Title of commercial | Length of commercial | Content rating of commercial | Skip counter for past "x" number of days | Original broadcast or streaming media details (date/time, channel or media stream) | Storage location of commercial, or pointer to storage location of commercial |
|---|---|---|---|---|---|---|---|---|
| 1119 | Toyota | vehicle | Toyota Corolla | 0:29 | G | 1 | | |
| 6843 | Apple | smartwatch | Apple Watch Series 4 | 0:29 | G | 3 | | |
| 6983 | Apple | smartphone | Iphone Xs max | 0:29 | G | 1 | | |
| ... | ... | ... | ... | ... | ... | ... | | |

Figure 4

SYSTEM AND METHOD FOR SELECTIVELY REPLACING COMMERCIALS THAT ARE IN A VIDEO DATA STREAM WITH ALTERNATIVE COMMERCIALS

BACKGROUND OF THE INVENTION

TV advertising commercials exist in virtually all video data streams, subsidizing some or all of the cost of providing the content to the viewer. Brands, such as CocaCola®, Anheuser-Busch® (Budweiser®), Toyota®, and Apple®, pay large sums of money to advertise their products on broadcast TV channels, and on newer forms of streaming TV services. However, when a particular commercial is aired or streamed, the targeted prospective consumer (TV viewer) may not necessarily see the commercial, even if the viewer is actively watching the TV. In one scenario, the viewer does not see the commercial because the TV is tuned to a different channel than the channel that the commercial is being broadcast or streamed on. For example, the viewer is watching the local channel that broadcasts NBC, but the commercial is being aired on the local channel that broadcasts ABC. In another scenario, the viewer has activated a smart feature on the TV that skips commercials without impacting program content, or has activated some other form of ad blocker that prevents commercials from being displayed without impacting program content, In either of these scenarios, the broadcaster or content streamer has properly performed their contractual duties by airing or streaming the commercial, but from the brand's perspective, no actual viewing of the commercial occurred, and the net result is no different than if the commercial was never aired or streamed at all. In another scenario when no commercial skipping feature or ad blocker is activated, and the viewer is actually watching a particular channel, the commercials that are currently being aired or streamed will actually be viewed, as hoped for by the advertisers.

The current state of affairs is highly disadvantageous to brands since they cannot exert sufficient control over whether or not their ad campaigns are being viewed. The present invention fulfills such a need by providing a mechanism to bring a level of fairness to the viewing process by ensuring that all commercials receive a fair share of "screen time."

SUMMARY OF THE PRESENT INVENTION

Systems and methods are provided for selectively replacing commercials that are in a video data stream with alternative commercials. Automatic content recognition (ACR) is performed on the video data stream to detect the identity of each of the commercials played in a commercial block during a commercial break. Commercials in the video data stream which are detected as being displayed on a video display device are stored in a first database, and commercials in the video data stream which are detected as not being displayed on the video display device are stored in a second database. A rules engine defines how commercials in the video data stream should be replaced with other commercials. Commercials in the video data stream that were previously detected as being displayed on the video display device are selectively replaced with commercials that were previously detected as not being displayed on the video display device.

BRIEF DESCRIPTION OF THE DRAWINGS

Preferred embodiments of the present invention will now be described by way of example with reference to the accompanying drawings.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

video data stream (also, referred to interchangeably as a "TV stream" and a "TV channel stream")—A video data stream includes (i) a conventional broadcast TV signal, typically delivered over a cable or fiber optic network via a set top box, CableCARD® or the like to a TV, (ii) an over-the-air (OTA) broadcast TV signal, and (iii) streaming services that deliver video content to a TV device that is connected to a viewer's home network. A video data stream may also be referred to as a "stream of audiovisual data" or an "audiovisual stream" since a video data stream typically includes audio.

commercial (also, referred to interchangeably as an "advertisement" or "ad")—A "commercial" is an advertisement for a product or service, and also includes advertising for program type content, known in the TV industry as a "promo." A commercial is thus distinguishable from "program type content." An example of "program type content" is a TV show.

commercial break (also, referred to interchangeably as a "block of commercial content," "commercial block," "ad block," or "ad pod")—Each commercial break includes a plurality of successive individual commercials. That is, the commercials are aired back-to-back in a set or group. Commercial breaks are interspersed during a TV program. The total length of the commercial breaks aired during a TV show is almost always significantly shorter than the length of the TV show. Likewise, the length of one commercial break is almost always significantly shorter than the lengths of the TV show segments that precede and follow the commercial break. A typical broadcast TV channel airs about 20 minutes of commercial content per hour. One common format for a commercial break is to show national advertisements first, followed by regional/local advertisements, and concluding with promos.

viewed commercial—a "viewed commercial" is a commercial that was properly displayed (both video and audio) during the TV show that the viewer is watching, as intended by the entity that broadcasted or streamed the commercial. Such a commercial is also interchangeably referred to as being "aired" or "played."

not viewed commercial—a "not viewed commercial" is a commercial that was not displayed during the TV show that the viewer is watching, but was intended by the entity that broadcasted or streamed the commercial to be displayed. Such a commercial is also interchangeably referred to as being "not aired," or "not played," or as being "skipped." A "not viewed" commercial also includes commercials where one of the audio and/or video was deleted (e.g., audio was muted, screen was made black).

II. Detailed Disclosure

Figure 1:
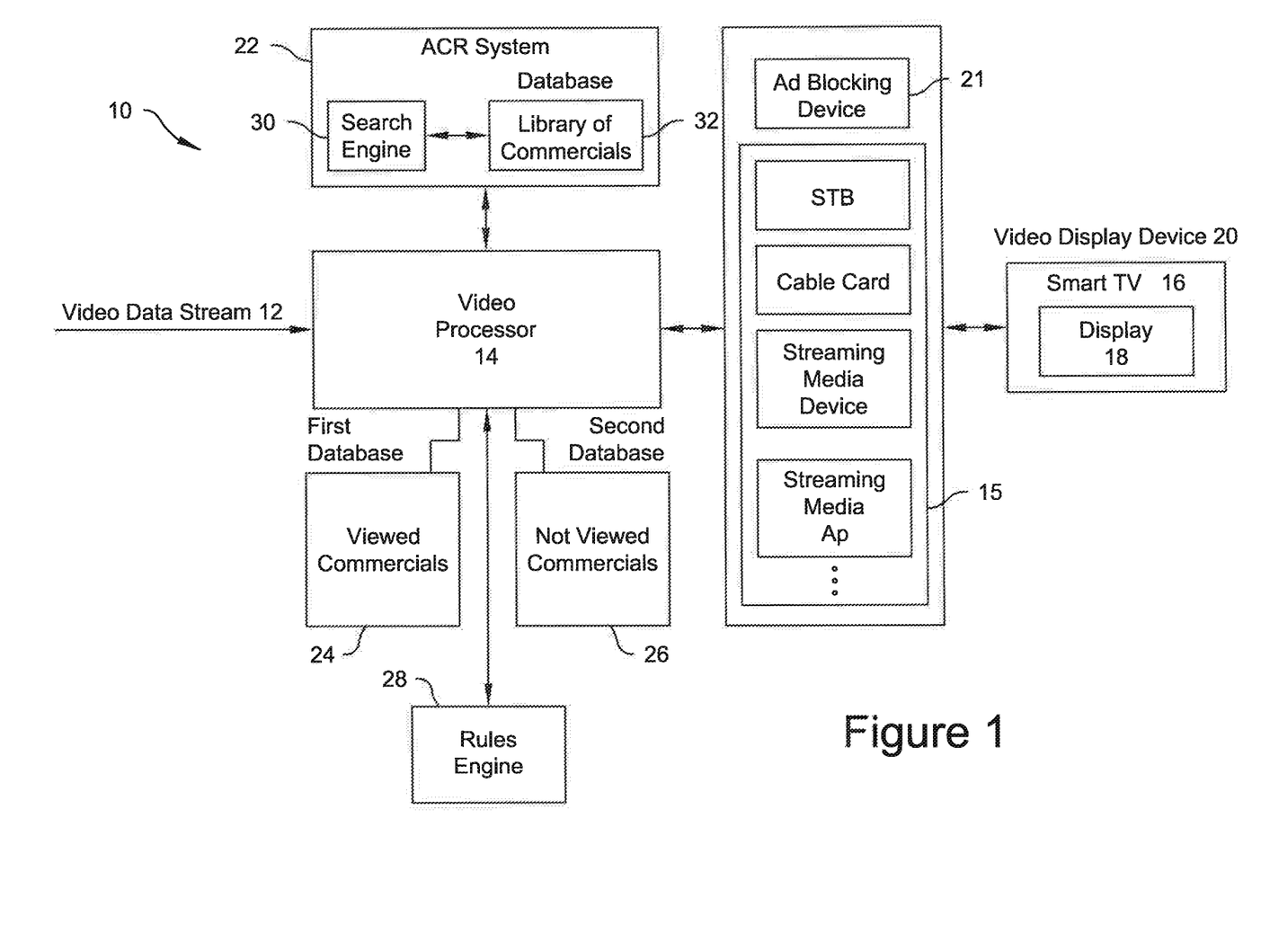
FIG. 1 is a schematic diagram of a system for implementing one preferred embodiment of the present invention.

FIG. 1 is a schematic diagram of a system 10 for implementing one preferred embodiment of the present invention. A TV channel feed or streaming media feed (hereafter, collectively referred to as a "video data stream 12") is received by a video processor 14 that is in electronic communication with a smart TV 16 having a display 18 via an intermediary device 15. The smart TV 16 and its display 18 is also collectively and interchangeably referred to herein as a "video display device 20." The intermediary device 15 may be (i) a set top box (STB), CableCARD®, or the like in the case of a broadcast TV signal, or (ii) a streaming media device or app, such as ROKU®, Hulu®, or Netflix®, in the case of a streaming service.

The video processor 14 is configured to perform at least the following functions, thereby acting as a "fair ad player":

1. Receive status information indicating what channel the video display device 20 is tuned to when using the set top box or its equivalent. The status information may be received from the video display device 20 itself, or from the set top box or its equivalent.

2. Receive status information from the video display device 20 regarding whether an ad blocking device 21 (also, referred to interchangeably as a "commercial blocking device 21") is in an active state wherein commercials are being blocked, or is in an inactive state wherein commercials are not being blocked.

3. Connect with an automated content recognition (ACR) system 22 so as to identify commercials in the video data stream in real-time, or near real-time.

4. Identify which commercials in the video data stream 12 were viewed on the video display device 20, and which commercials in the video data stream were not viewed on the video display device 20.

4. Maintain a first database 24 of commercials that were present in the video data stream 12 and were detected as being viewed on the video display device 20, and maintain a second database 26 of commercials that were present in the video data stream 12 and were detected as not being viewed on the video display device 20. The commercials in the second database 26 are used for the replacements. The second database 26 preferably stores the actual commercial so that it is immediately available for replacement by the video processor 14. Alternatively, if system bandwidth is sufficiently high, the second database 26 may store only a pointer to the commercial, and the actual commercial is stored remote from the system 10 and is retrieved in near real-time when needed for replacement.

5. Selectively replace commercials in the video data stream 12 with alternative commercials so that the alternative commercials are viewed on the video display device 20 in place of the originally aired or streamed commercials.

6. Interact with a rules engine 28 to perform the selective replacement. The rules engine 28 defines the rules for performing the replacement, if any.

Figure 2:
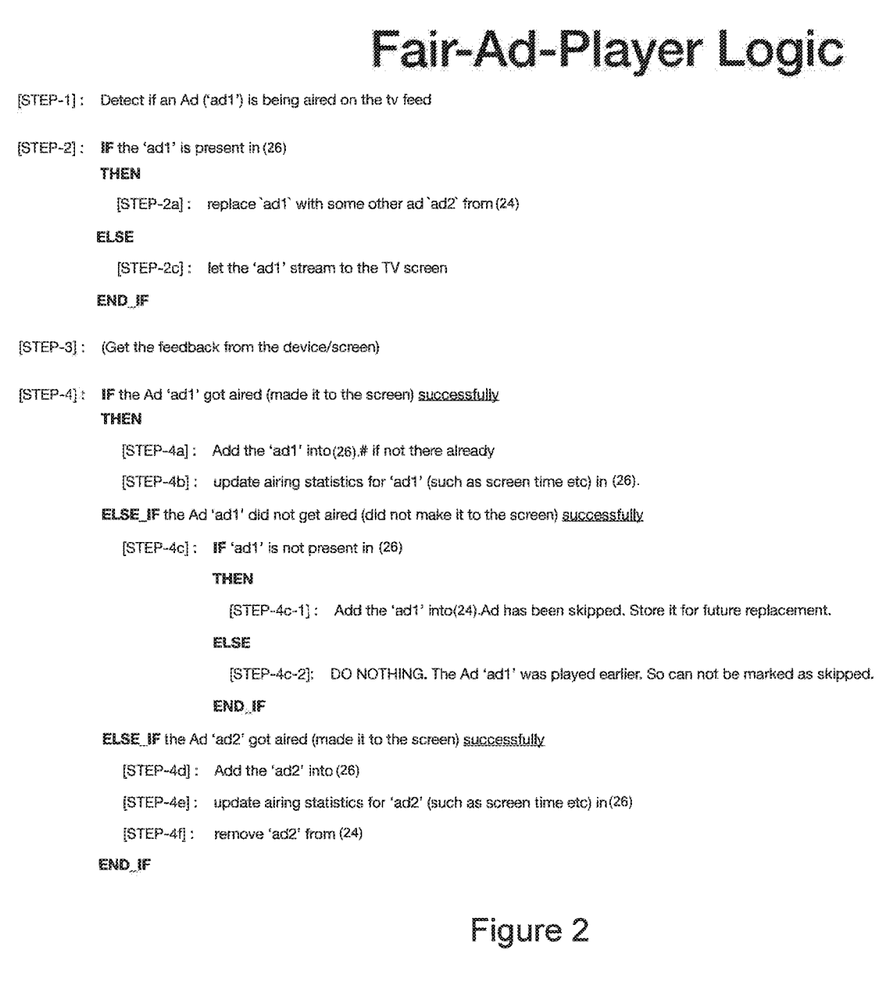
FIG. 2 shows sample pseudocode for the rules engine in accordance with one preferred embodiment of the present invention.

FIG. 2 shows sample pseudocode for the rules engine 28. The overall process is that whenever a commercial is detected as being viewed on the video display device 20, a record of the viewing is made in the first database 24. Alternatively, the commercial itself is stored, if desired. Whenever a commercial is detected as not being viewed on the video display device 20, the commercial, or a pointer thereto, is stored in the second database 26.

In addition to the pseudocode shown in FIG. 2, the rules engine 28 takes additional parameters into consideration when finding a replacement commercial. Examples of such parameters are as follows:

i. Length of the commercial: When replacing commercials in a broadcast TV channel feed, the length of the replacement commercial must be exactly the same as the commercial to be replaced so as to avoid changing the air time of the program type content. When replacing commercials in a streaming media feed, the length of the replacement commercial should also be exactly the same as the commercial to be replaced when the viewing time of the program type content needs to remain unchanged. The replacement commercial may also be one or more commercials that have the same length as the commercial being replaced. For example, a 30 second commercial may be replaced with two 15 second commercials.

When replacing commercials in a streaming media feed, if the program content does not require the same viewing time as the original streaming media feed, the length of the replacement commercial may be longer or shorter than the commercial to be replaced.

ii. Brand of the commercial: Preferably, the replacement commercial is for the same brand as the commercial to be replaced (e.g., original Toyota commercial is replaced with a different Toyota commercial). However, depending upon the arrangements made with ad agencies or company media buyers, the brands may differ.

iii. Product type of the commercial: Preferably, the replacement commercial is for the same product type (e.g., beer, automobile) as the commercial to be replaced. Again, depending upon the arrangements made with ad agencies or company media buyers, the brands may differ.

iv. Content rating: The content rating (e.g., G, PG-13, R) of the replacement commercial is preferably the same or lower than the commercial being replaced. For example, a G-rated commercial is not replaced with an R-rated commercial, but an R-rated commercial may be replaced with another R-rated commercial, or a PG-13, or G-rated commercial.

Regarding the second database 26, some scenarios that result in populating this database with commercials are simple to detect. Consider the example of a broadcast TV channel feed. For simplicity, assume that only ten stations 1-10 are being broadcast. If the video display device 20 is tuned to channel 5, and no ad blocking device 21 is active, then all detected commercials broadcast on channels 1-4 and 6-10, or identifying information thereof, are stored in the second database 26 and all detected commercials, or identifying information thereof, broadcast on channel 5 are stored in the first database 24. If an ad blocking device is active, then all detected commercials broadcast on channels 1-10, or identifying information thereof, are stored in the second database 26.

The identification of commercials is performed using the video processor 14 in conjunction with the ACR system 22. The ACR system 22 detects commercial breaks and individual commercials within a commercial break. If a commercial cannot be detected, then it is ignored, or placed in a workflow queue (not shown) for subsequent automated or manual identification. If, or when, it is identified, it can then be stored in the second database 26. Detecting commercials and commercial breaks are well-known in the art, and any number of conventional techniques may be used for this purpose.

Some conventional technology for identifying where commercials exist in a video data stream is described in an article entitled "Automatic Detection of TV Commercials" (Satterwhite, B.; Marques, O.; Potentials, IEEE, Volume 23, Issue 2, April-May 2004 pp. 9-12). Satterwhite et al. describes two main categories of methods for detecting commercials, namely, "feature-based detection" and "recognition-based detection." Feature-based detection uses general characteristics of commercials embedded within a media stream to detect their possible presence. Recognition-based detection works by trying to match commercials with ones that were already learned. Additional techniques are described in U.S. Pat. No. 9,628,836 (Kalampoukas et al.), which is incorporated by reference in its entirety herein.

The ACR system 22 includes a conventional search engine 30 to perform content recognition and a database 32 that includes a library of known commercials. ACR systems that are suitable for use in the present invention are described in U.S. Pat. No. 9,628,836. Search engines 30 that perform the type of recognition described above are well-known in the art and are incorporated into automated content recognition (ACR) systems. One type of ACR system 22 having such a search engine 30 uses audio fingerprints within video signals to perform the content recognition. One commercially available audio ACR system is made by Audible Magic Corporation, Los Gatos, Calif. Another commercially available audio ACR system is Gracenote Entourage™ commercially available from Gracenote, Inc., Emeryville, Calif. Other ACR systems are disclosed in U.S. Patent. Nos. 2011/0289114 (Yu et al.), 2013/0071090 (Berkowitz et al.), and 2013/0205318 (Sinha et al.), each of which are incorporated by reference herein. Accordingly, the details of the search engine 30 with respect to the recognition processing is not further described.

As is well-known in the art, search engines associated with ACR systems perform the comparisons on representations of content, such as fingerprints of the content. Thus, in one embodiment, the database 32 maintains segment representations in the form of segment fingerprints for comparison with fingerprints of parsed content in the incoming video data stream 12. As is also well-known in the art, a "fingerprint" is typically composed of a string of individual fingerprints, each capturing a very small segment of the content's audio and/or video.

One preferred embodiment of the present invention described above uses an audio ACR system to perform the functions of the search engine 30. However, it is well-known in the art that ACR systems may use video, as well as combinations of audio and video to perform the content (segment) comparison and recognition, and the scope of the present invention includes such combinations.

Figure 3:
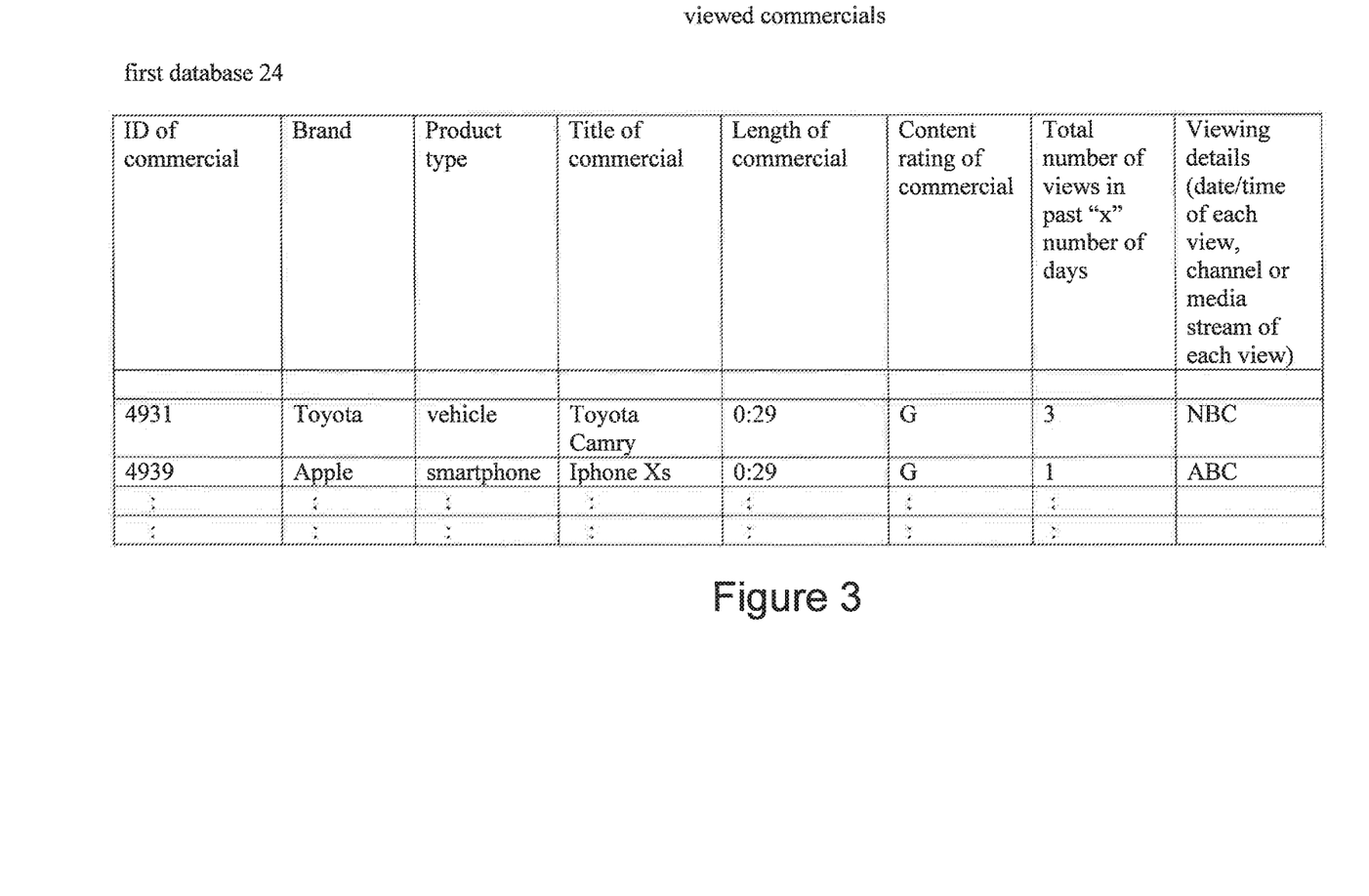
FIGS. 3 and 4 are database tables of the system in accordance with one preferred embodiment.

FIG. 3 is a sample database illustrating selected fields of the first database 24. For illustration purposes, some of the data fields are shown in simplified form. Some of the fields are not shown with sample data, since the contents are self-explanatory. Sample fields include: ID of commercial (designated by indexer or brand owner)

i. Brand (e.g., Coca-Cola, Anheuser-Busch (Budweiser), Toyota, and Apple
ii. Product type (e.g., soft drink, beer, vehicle, smartphone)
iii. Title of commercial (designated by indexer or brand owner)
iv. Length of commercial
v. Content rating of commercial
vi. Total number of views (cumulative views in the past "x" number of days, wherein "x" is the predesignated tracking period)
vii. Viewing details, including date/time of each view, channel or media stream of each view (e.g., NBC, Netflix, CBS, Hulu)

Figure 4:
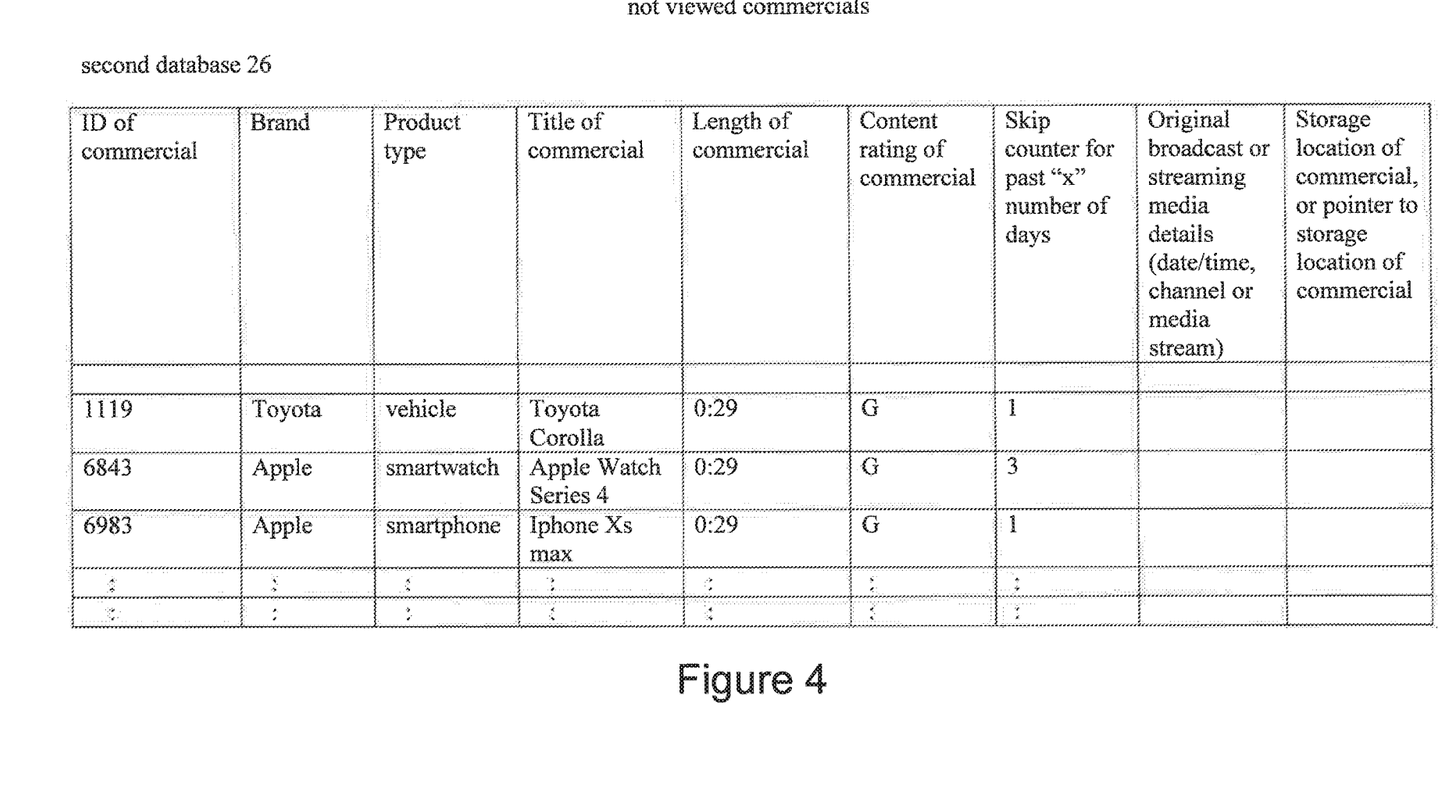

FIG. 4 is a sample database illustrating selected fields of the second database 24. Again, for illustration purposes, some of the data fields are shown in simplified form. Some of the fields are not shown with sample data, since the contents are self-explanatory. Sample fields include:
i. ID of commercial (designated by indexer or brand owner)
ii. Brand (e.g., Coca-Cola, Anheuser-Busch (Budweiser), Toyota, and Apple
iii. Product type (e.g., soft drink, beer, vehicle, smartphone)
iv. Title of commercial (designated by indexer or brand owner)
v. Length of commercial
vi. Content rating of commercial
vii. Skip counter for past "x" number of days (this is the number of times that the commercial was detected in the video data stream 12, but not viewed, within the predesignated tracking period). This is an optional feature that increase the robustness of the system 10.
viii. Original broadcast or streaming media details, including date/time, channel or media stream
ix. Storage location of commercial, or pointer to storage location of commercial Consider the following example scenarios which illustrate the features of the present invention.

Example 1 (Ad Blocking Device 21 is Either not Present, or is Present but not Active)

Example 1A

The TV is tuned to the cable network's local NBC affiliate via an STB. The video processor 14 detects commercial #4931 in the video data stream 12. As shown in FIG. 3, this commercial has been viewed 3 times within the tracking period. The rules engine 28 causes the commercial #4931 to be replaced by commercial #1119 shown in FIG. 4, which is a commercial of similar length for the same brand owner, and which was skipped one time within the tracking period. The commercial #1119 is then removed from the second database 26 and is added to the first database 24 (not shown).

Example 1B

The TV is tuned to the cable network's local ABC affiliate via an STB. The video processor 14 detects commercial #4939 in the video data stream 12 airing on ABC. As shown in FIG. 3, this commercial has been viewed one time within the tracking period. The rules engine 28 causes the commercial #4939 to be replaced by commercial #6843 shown in FIG. 4, which is a commercial of similar length for the same brand owner, and which was skipped three times within the tracking period. The commercial #4939 is then added to the first database 24 (not shown). In one preferred embodiment, the commercial #4939 is not removed from the second database 26, but the skip counter is decremented from "3" to "2." In this manner, the commercial #4939 is still available for a subsequent replacement. In another preferred embodiment, the commercial #4939 is removed from the second database 26, even though it has been skipped multiple times.

Example 2 (Ad Blocking Device 21 is Either Not Present, or is Present But Not Active)

The TV is tuned to NBC via the STB. The video processor 14 detects commercial #1119 in the video data stream 12 airing on NBC. The rules engine 28 sees that this commercial was previously skipped, and thus does not cause any replacement to occur, and the commercial #1119 is allowed to be viewed, as is. The commercial #1119 is then removed from the second database 26. If a skip counter is present, the skip counter is decremented for the commercial #1119, and the commercial #1119 is removed only after the skip counter reaches zero.

In Examples 1 and 2, all of the commercials detected on the remaining channels (i.e., the channels that the TV is not tuned to) are stored in the second database 26.

As described above, the second database 26 may include a skip counter, so that when a commercial in the second database 26 is used to replace a commercial, or when a commercial in the video data stream 12 is actually viewed, the skip counter is decremented. The commercial is only removed from the second database 26 when the skip counter reaches zero. The skip counter improves the fairness of the process since commercials that are repeatedly skipped don't get automatically removed from the second database 26 just because they were used for one replacement.

The pseudocode of FIG. 2 does not take into account the skip counter embodiment. However, if the skip counter is used, the pseudocode would be slightly modified as follows:

i. A commercial that is already present in the second database 26 and is detected as being "not aired," causes the skip counter to be incremented by 1.

ii. A commercial that is already present in the second database 26 and is used as a replacement commercial, or is detected as being "'aired" (not as a result of a replacement), causes the skip counter to be decremented by 1.

iii. When a skip counter is decremented for a particular commercial, an additional line of pseudocode tests whether the skip counter is "1" (before being decremented), and if so, the commercial is removed from the second database 26. Alternatively, the skip counter is allowed to be decremented to "0," and the pseudocode tests whether the skip counter is "0." If so, the commercial is removed from the second database 26.

Example 3 (Streaming Media—Ad Blocking Device 21 is Present and in an Active State)

When the video display device 20 is used to view streaming media, the video data stream 12 would typically include the equivalent of only one channel (i.e., the program that the user requested). In this scenario, the only time that a commercial would not be viewed is if an ad blocking device 21 is present and is in an active state. Thus, if an ad blocking device 21 is present and in an active state, then all detected commercials are added to the second database. If no ad blocking device 21 is present, or if an ad blocking device 21 is present, but is in an inactive state, then all detected commercials are added to the first database 24.

In a real-world scenario, the second database 26 will include an extremely large number of commercials because only a tiny fraction of commercials in the video data stream 12 will actually be viewed in any given viewing session. Brand owners and/or content owners of the video content streams (e.g., ABC, NBC) preferably provide instructions for the rules engine 28 regarding how replacements should occur for their respective commercials when there are multiple options for replacement (e.g., four different Toyota commercials are potential candidates for replacing a previously viewed Toyota commercial in the video data stream 12 airing on a tuned in channel when no ad blocking device is active). Preferably, the rules are designed to maximize exposure to the brand's full range of commercials.

In an alternative embodiment, the replacement may occur between different brands, especially if done in a manner that does not prejudice any one brand. This may improve exposure for both of the brands. Cross-brand replacements would occur only at the video content owner's discretion. Commercial spots may have been sold to different brands at different prices, and some brands may have been given guaranteed airing (TV display) slots at higher prices, as opposed to other brands which can be skipped.

III. Additional Considerations

A. Detection of Viewed Channel

In one preferred embodiment, the intermediary device 15 includes hardware and/or software configured to communicate the tuned in channel to the video processor 14 so that the video processor 14 can properly direct the commercials on the remaining channels of the video data stream 12 to the second database 26 of "not viewed" commercials. However, in an alternative embodiment, the ACR system 22 detects the tuned in channel in real-time by using ambient audio sampled in the vicinity of the video display device 20, or by using the audio and/or video data of the TV signal itself that is being viewed. Fingerprints of the audio and/or video signals are then compared to fingerprints of existing broadcasted channels to identify a match, and thereby identify the tuned in channel. Any conventional ACR system may be used for this purpose.

B. Ad Blocking Device 21

If an ad blocking device 21 is present in the system 10, the ad blocking device 21 must be configured to report its status (e.g., active state, inactive state) to the video processor 14. This is a straightforward programming task for a skilled artisan since the device state is already known internally by the device 21, and simply must be communicated to the video processor 14. The ad blocking device 21 is primarily relevant to the streaming media scenario. One well-known ad blocking device 21 used for streaming media is Auto-Hop® for the DISH® Network.

Ad blocking devices 21 can also be used in live broadcast environments, but such devices often only mute the audio or turn the TV screen black during the commercials, as opposed to completely skipping over the time period when the commercials are aired. The status of such devices may also be detected, thereby causing the commercials on the tuned in channel to be treated as not viewed, and thus added to the second database.

C. Replacement Logic

As discussed above, the main embodiment is that commercials detected as not being viewed are recorded and then used as replacements for subsequently appearing commercials that have been previously viewed, thereby improving the overall fairness of the commercial airing process. As shown in FIG. 3, the system 10 may also track the total number of views in the past "x" number of days. As shown in FIG. 4, the system 10 may also maintain a "skip counter" that tracks the number of times that a commercial was not viewed. The rules engine 28 may incorporate rules that use the total number of views and the skip counter in deciding when, or if, to replace commercials. Some examples of how such values can be used are provided below:

i. When performing a "same brand" replacement, give priority for replacement to the commercials with the highest skip counter, thereby addressing the greatest incidents of unfairness first.

ii. When performing a "same brand" replacement, don't perform a replacement if the total number of views is very low (e.g., 1 or 2) and the skip counter for the suitable replacement commercial is also very low (e.g., 1 or 2), since a significant level of viewing unfairness has not yet been reached. Thus, there may be certain scenarios where replacement does not occur, even when a previously viewed commercial is detected. Accordingly, the replacement process is referred to herein as being "selective."

iii. When performing a "same brand" replacement, give priority to a replacement of the same product type over the same brand, if a choice is available (e.g., replace a viewed Apple smartphone commercial with a "not viewed" Apple smartphone commercial, as opposed to a "not viewed" Apple smartwatch commercial).

An artisan will recognize that the replacement logic can be specifically tailored to achieve any desired goals, and the scope of the invention is not limited to any specific set of replacement rules.

D. Commercial Replacement for Streaming Video

When replacing commercials in a live broadcast environment, the replacement should preferably occur using a commercial of similar length to avoid overlapping with the program content, or having dead air space until the program content resumes. However, in a streaming environment, this concern is lessened since the program content may simply resume when the commercial content ends. One example of a system that performs video ad swapping in a video streaming system, and which may be used in the present invention, is described in U.S. Pat. No. 8,966,520 (Tom et al.) and U.S. Pat. No. 9,066,159 (Mak), both of which are incorporated by reference herein. These patents describe the technical details of the "Ad Swap" feature of Hulu where users may customize their ad experience. The "Ad Swap" feature is a form of well-known Dynamic Ad Insertion (DAI) technology.

E. Commercial Replacement for Live TV

Dynamic Ad insertion (DAI) technology may also be used to swap out commercials in live TV environments. While DAI typically operates at a head-end in such environments, the same technology may be employed locally at the video processor 14.

The present invention may be implemented with any combination of hardware and software. If implemented as a computer-implemented apparatus, the present invention is implemented using means for performing all of the steps and functions described above.

When implemented in software, the software code for the video processor 14 and search engine 30 can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the video processor 14 and the search engine 30 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The video processor 14 and the search engine 30 are not general-purpose computers, but instead are specialized computer machines that perform a myriad of video processing and search functions that are not native to a general-purpose computer, absent the addition of specialized programming.

The video processor 14, ACR system 22, first and second databases 24 and 26, rules engine 28, and intermediary devices 15 may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method for selectively replacing commercials that are in a video data stream with alternative commercials, wherein the commercials are played in commercial blocks, each commercial block including a sequence of individual commercials played in successive time windows, wherein at least portions of the video data stream are displayed on a video display device, the method comprising:
   (a) performing, using a search engine in communication with a library of commercials, automatic content recognition (ACR) on the video data stream and detecting the identity of each of the commercials played in a commercial block during a commercial break, wherein the ACR evaluates a succession of samples of each of the commercials against a database of files for commercials in the library of commercials;
   (b) detecting, using a video processor, which commercials in the video data stream are displayed on the video display device, and which commercials in the video data stream are not displayed on the video display device, wherein step (b) is a separate and distinct step from step (a);
   (c) storing in a first database records of the commercials that were displayed on the video display device;
   (d) storing in a second database records of the commercials that were not displayed on the video display device;
   (e) providing a rules engine that defines how commercials in the video data stream should be replaced with other commercials; and
   (f) selectively replacing, using the video processor in electronic communication with the first and second database and the rules engine, commercials in the video data stream that were previously detected as being displayed on the video display device with commercials that were previously detected as not being displayed on the video display device,
   wherein the video data stream includes a plurality of different broadcast channels, and the video display device is tuned at any one time to only one of the broadcast channel, and wherein at least some of the commercials that were not displayed on the video display device were not displayed because they were broadcast on a channel that the video display device was not tuned to.

2. The method of claim 1 wherein in step (f), the replaced commercials have one or more of the following characteristics compared to the commercials being replaced:
   (i) same length,
   (ii) same brand,
   (iii) same product type, and
   (iv) same or lower content rating, and
   wherein the rules engine includes the one or more characteristics.

3. The method of claim 1 wherein the first database records a number of times that the commercials that were displayed on the video display device, and the second database records the number of times that the commercials were not displayed on the video display device, and
   wherein the rules engine includes rules for balancing out the commercial replacement, using the number of times that the commercials were displayed on the video display device, and the number of times that the commercials were not displayed on the video display device.

4. The method of claim 1 wherein a commercial blocking device, when in an active state, prevents commercials from being displayed on the video display device, and wherein step (f) occurs only when the commercial blocking device is in an inactive state.

5. A method for selectively replacing commercials that are in a video data stream with alternative commercials, wherein the commercials are played in commercial blocks, each commercial block including a sequence of individual commercials played in successive time windows, wherein at least portions of the video data stream are displayed on a video display device, the method comprising:
   (a) performing, using a search engine in communication with a library of commercials, automatic content recognition (ACR) on the video data stream and detecting the identity of each of the commercials played in a commercial block during a commercial break, wherein the ACR evaluates a succession of samples of each of the commercials against a database of files for commercials in the library of commercials;
   (b) detecting, using a video processor, which commercials in the video data stream are displayed on the video display device, and which commercials in the video data stream are not displayed on the video display device, wherein step (b) is a separate and distinct step from step (a);
   (c) storing in a first database records of the commercials that were displayed on the video display device;
   (d) storing in a second database records of the commercials that were not displayed on the video display device;
   (e) providing a rules engine that defines how commercials in the video data stream should be replaced with other commercials; and
   (f) selectively replacing, using the video processor in electronic communication with the first and second database and the rules engine, commercials in the video data stream that were previously detected as being displayed on the video display device with commercials that were previously detected as not being displayed on the video display device,
   wherein a commercial blocking device is associated with the video display device, and wherein at least some of the commercials that were not displayed on the video display device were not displayed because they were blocked by the commercial blocking device, and wherein the commercial blocking device blocks all detected commercials.

6. The method of claim 5 wherein in step (f), the replaced commercials have one or more of the following characteristics compared to the commercials being replaced:
   (i) same length,
   (ii) same brand,
   (iii) same product type, and
   (iv) same or lower content rating, and wherein the rules engine includes the one or more characteristics.

7. The method of claim 5 wherein the first database records a number of times that the commercials that were displayed on the video display device, and the second database records the number of times that the commercials were not displayed on the video display device, and wherein the rules engine includes rules for balancing out the commercial replacement, using the number of times that the commercials were displayed on the video display device, and the number of times that the commercials were not displayed on the video display device.

8. The method of claim 5 wherein the commercial blocking device, when in an active state, prevents all commercials from being displayed on the video display device, and wherein step (f) occurs only when the commercial blocking device is in an inactive state.

9. A system for selectively replacing commercials that are in a video data stream with alternative commercials, wherein the commercials are played in commercial blocks, each commercial block including a sequence of individual commercials played in successive time windows, wherein at least portions of the video data stream are displayed on a video display device, the system comprising:
  (a) a search engine in communication with a library of commercials configured to perform, automatic content recognition (ACR) on the video data stream and detect the identity of each of the commercials played in a commercial block during a commercial break, wherein the ACR evaluates a succession of samples of each of the commercials against a database of files for commercials in the library of commercials;
  (b) a video processor configured to detect which commercials in the video data stream are displayed on the video display device, and which commercials in the video data stream are not displayed on the video display device, wherein the detection by the video processor is a separate and distinct action from the ACR performed by the search engine;
  (c) a first database that stores records of the commercials that were displayed on the video display device;
  (d) a second database that stores records of the commercials that were not displayed on the video display device; and
  (e) a rules engine configured to define how commercials in the video data stream should be replaced with other commercials,
    wherein the video processor is in electronic communication with the first and second database and the rules engine, and is further configured to selectively replace commercials in the video data stream that were previously detected as being displayed on the video display device with commercials that were previously detected as not being displayed on the video display device, and
    wherein the video data stream includes a plurality of different broadcast channels, and the video display device is tuned at any one time to only one of the broadcast channel, and wherein at least some of the commercials that were not displayed on the video display device were not displayed because they were broadcast on a channel that the video display device was not tuned to.

10. The system of claim 9 wherein the replaced commercials have one or more of the following characteristics compared to the commercials being replaced:
  (i) same length,
  (ii) same brand,
  (iii) same product type, and
  (iv) same or lower content rating, and
  wherein the rules engine includes the one or more characteristics.

11. The system of claim 9 wherein the first database records a number of times that the commercials that were displayed on the video display device, and the second database records the number of times that the commercials were not displayed on the video display device, and
  wherein the rules engine includes rules for balancing out the commercial replacement, using the number of times that the commercials were displayed on the video display device, and the number of times that the commercials were not displayed on the video display device.

12. The system of claim 9 wherein a commercial blocking device, when in an active state, prevents commercials from being displayed on the video display device, and wherein the selective replacement of commercials occurs only when the commercial blocking device is in an inactive state.

13. A system for selectively replacing commercials that are in a video data stream with alternative commercials, wherein the commercials are played in commercial blocks, each commercial block including a sequence of individual commercials played in successive time windows, wherein at least portions of the video data stream are displayed on a video display device, the system comprising:
  (a) a search engine in communication with a library of commercials configured to perform, automatic content recognition (ACR) on the video data stream and detect the identity of each of the commercials played in a commercial block during a commercial break, wherein the ACR evaluates a succession of samples of each of the commercials against a database of files for commercials in the library of commercials;
  (b) a video processor configured to detect which commercials in the video data stream are displayed on the video display device, and which commercials in the video data stream are not displayed on the video display device, wherein the detection by the video processor is a separate and distinct action from the ACR performed by the search engine;
  (c) a first database that stores records of the commercials that were displayed on the video display device;
  (d) a second database that stores records of the commercials that were not displayed on the video display device; and
  (e) a rules engine configured to define how commercials in the video data stream should be replaced with other commercials,
    wherein the video processor is in electronic communication with the first and second database and the rules engine, and is further configured to selectively replace commercials in the video data stream that were previously detected as being displayed on the video display device with commercials that were previously detected as not being displayed on the video display device, and
    wherein a commercial blocking device is associated with the video display device, and wherein at least some of the commercials that were not displayed on the video display device were not displayed because they were blocked by the commercial blocking device, and wherein the commercial blocking device blocks all detected commercials.

14. The system of claim 13 wherein the replaced commercials have one or more of the following characteristics compared to the commercials being replaced:
(i) same length,
(ii) same brand,
(iii) same product type, and
(iv) same or lower content rating, and
wherein the rules engine includes the one or more characteristics.

15. The system of claim 13 wherein the first database records a number of times that the commercials that were displayed on the video display device, and the second database records the number of times that the commercials were not displayed on the video display device, and
wherein the rules engine includes rules for balancing out the commercial replacement, using the number of times that the commercials were displayed on the video display device, and the number of times that the commercials were not displayed on the video display device.

16. The system of claim 13 wherein the commercial blocking device, when in an active state, prevents all commercials from being displayed on the video display device, and wherein the selective replacement of commercials occurs only when the commercial blocking device is in an inactive state.

* * * * *